Patented Aug. 24, 1937

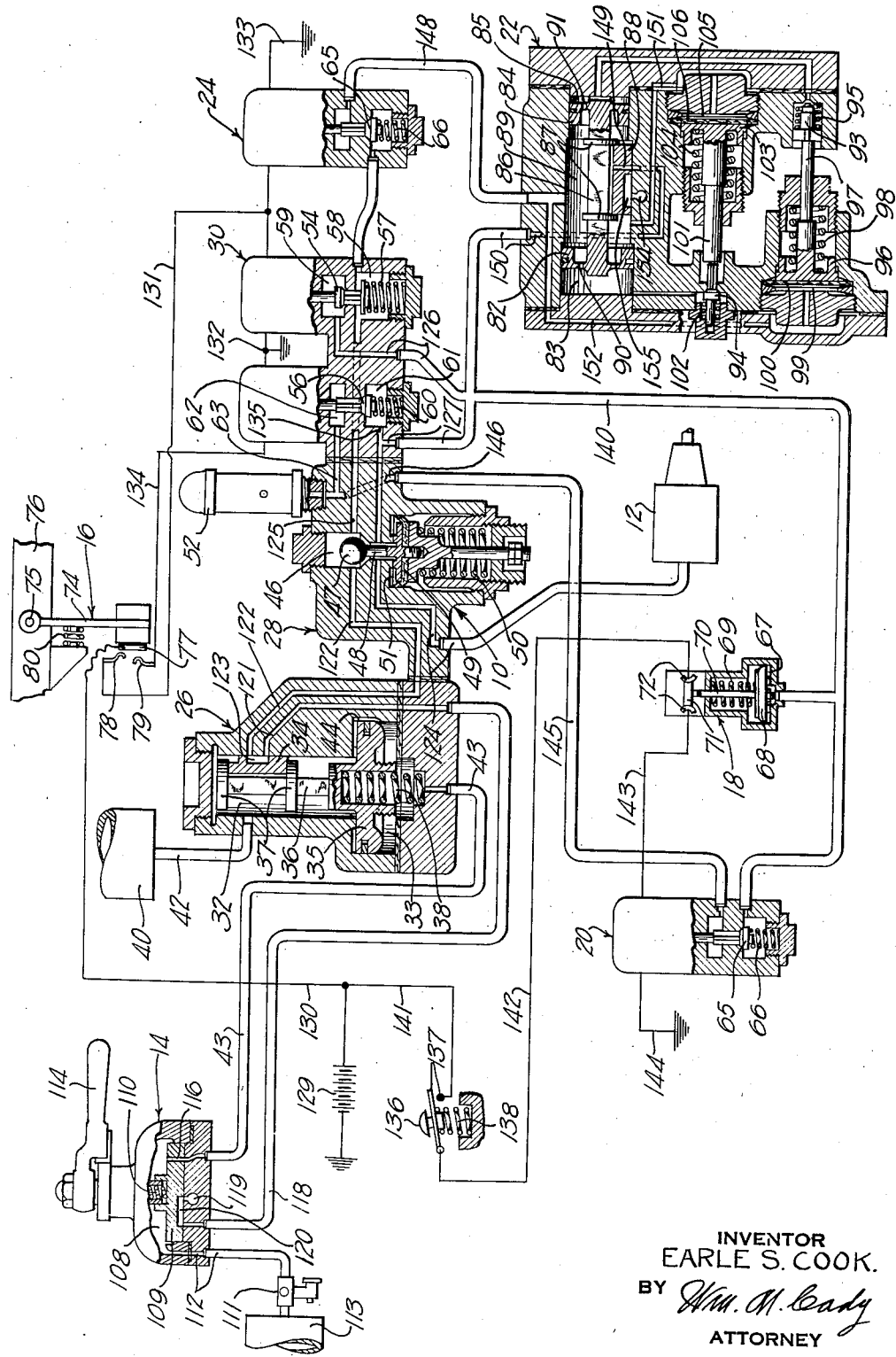

2,090,996

UNITED STATES PATENT OFFICE 2,090,996

RETARDATION CONTROLLED BRAKE

Earle S. Cook, Wilkinsburg, Pa., assignor to The Westinghouse Air Brake Company, Wilmerding, Pa., a corporation of Pennsylvania Application January 26, 1935, Serial No. 3,612

13 Claims. (Cl. 303—24)

This invention relates to retardation controlled brakes, and more particularly to a brake system for high speed railway trains and vehicles in which means are employed for controlling the degree of braking to prevent an increase in the rate of retardation beyond a maximum value.

Modern conditions have necessitated that railway trains and vehicles, particularly those intended for passenger service, be operated at speeds much higher than were formerly common practice. In order to provide for adequate braking of these high speed trains and vehicles a number of new type brake systems have heretofore been proposed, each of which has sought to combine a high degree of reliability with simplicity of operation. One example of the heretofore proposed systems is that described and claimed in the application of Clyde C. Farmer, Serial No. 712,153, filed February 20, 1934, for an Electropneumatic brake. A feature found in this and other similar systems is that a control valve device is provided on each car in the train, and each control valve device has embodied therein certain electrically operated valves under the control of a retardation controller device on the head end or control car. The retardation controller device controls these valves throughout the train in a manner such that the rate of retardation produced by braking is not permitted to exceed a chosen maximum value, which in the majority of cases will not result in wheel sliding.

The retardation controller device employed is most generally operable to limit the maximum permissible rate of retardation to one maximum value. A disadvantage of thus limiting the rate of retardation to one maximum value is that the stop may be too abrupt at the end and thereby cause some discomfort to passengers, as well as increasing the danger of producing damaging shocks throughout the train. It is desirable that means be provided for reducing the maximum rate of retardation at the end of the stop so that the abruptness of the stop, and shocks, may be eliminated.

It is therefore a principal object of the present invention to provide a brake system for high speed vehicles and trains in which means are provided for limiting the maximum rate of retardation due to braking and in which the degree of braking is reduced near the end of the deceleration period, so that a lower than maximum rate of retardation will result and a smoother stop thereby accomplished.

A further object of the invention is to provide a brake system of this character in which means are provided for insuring a predetermined application of the brakes upon faulty operation of the retardation controlling means, the degree of application thus effected being sufficient in all cases to bring the train or vehicle to a stop.

Yet further objects, including a novel arrangement of and utilization of specific apparatus, will be more apparent from the following description, which is taken in connection with the single figure of the attached drawing showing one form that the invention may take.

Considering this form of the invention briefly at first, it will be seen that it has been shown as applied to one car of a train only, but as will hereinafter be pointed out, by the duplication of some of the parts on succeeding cars a complete train braking system results.

In the embodiment shown, I have provided a control valve device 10 for controlling the supply of fluid under pressure to a brake cylinder 12. The control valve device 10 is operable either by straight air operation or by automatic operation, as these terms are commonly known in the art.

For controlling applications of the brakes, both by straight air operation and by automatic operation, I have provided a brake valve device 14.

For limiting the rate of retardation produced by braking to a maximum value, I have provided a retardation controller device 16.

For reducing the degree of braking at the end of the deceleration period, so as to make a smooth stop, I have provided a pneumatic switch device 18 and a release by-pass magnet valve device 20.

For insuring an application of the brakes sufficient to stop the vehicle or train upon faulty operation of the retardation controller device 16, or upon energization of the associated control circuits at unintended times, I have provided a governor valve device 22 and a cut-off by-pass magnet valve device 24.

Considering now these devices more in detail, the control valve device comprises an emergency valve section 26, an inshot valve section 28, and a magnet valve section 30.

The emergency valve section 26 is embodied in a casing provided with a slide valve chamber 32 and a piston chamber 33. Disposed in the slide valve chamber 32 is a slide valve 34, and disposed in the piston chamber 33 is a piston 35 having a stem 36 with collars 37 secured thereto for engaging the slide valve 34 and for moving it coextensive with movement of the piston 35. A spring 38 urges the piston 35 upwardly to a biased position.

The slide valve chamber 32 is in constant communication with an emergency reservoir 40 by way of pipe 42. The piston chamber 33 is connected to an emergency pipe 43, and when the piston 35 is in its upper or biased position a feed groove 44 provides a charging communication between the piston chamber 33 and the slide valve chamber 32.

The inshot valve section 28 is embodied in a casing having a valve chamber 46 in which is disposed a ball valve 47. The ball valve 47 is urged toward an unseated position by a stem 48 associated with a piston 49 urged upwardly by a spring 50. The ball valve 47 is adapted to be seated when fluid pressure in piston chamber 51 reaches a predetermined value, as for example 10 pounds per square inch, and has thus actuated the piston 49 downwardly.

Secured to the inshot valve section 28 is a safety valve device 52. This safety valve device is preferably of the type commonly employed in connection with fluid pressure brake systems, and its function, as is well known in the art, is to prevent the release of pressure from the volume connected thereto below a predetermined value. For the purpose of this disclosure, and by way of illustration, it will be assumed that the safety valve device is set to retain a pressure in the volume connected thereto slightly above that which actuates the inshot piston 49 downwardly far enough to seat the ball valve 47. The purpose of this will appear more fully presently.

The magnet valve section 30 is embodied in a casing having disposed therein a cut-off valve 54 and a release valve 56. The cut-off valve 54 is urged toward an unseated position by a spring 57, and when in unseated position permits fluid under pressure to flow from a lower chamber 58 to an upper chamber 59. The valve 54 is adapted to be actuated to seated position by action of an electromagnet in the upper part of the casing, which when energized actuates the valve downwardly to cut off communication between the two chambers 58 and 59.

The release valve 56 is adapted to be urged toward seated position by a spring 60, and toward unseated position by action of another electromagnet in the upper part of the casing, which when energized actuates the valve downwardly. When the release valve 56 is unseated, a communication is established between a lower chamber 61 and an upper chamber 62, which is in communication with the aforementioned safety valve device 52 by way of passage 63.

The release by-pass magnet valve device 26 and the cut-off by-pass magnet valve device 24 are substantially duplicates, each being embodied in a casing provided with a valve 65 urged toward a seated position by a spring 66 and toward an unseated position by action of an electromagnet which when energized actuates the valve downwardly.

The pneumatic switch device 18 is embodied in a casing having a piston chamber 67 in which is disposed a piston 68 urged downwardly by a spring 69. The piston 68 is provided with a stem 70 which has secured thereto and insulated therefrom a contact 71, which is adapted to engage and bridge stationary contacts 72 when the piston 68 is in its lowermost position.

The retardation controller device 16 may be one of a large number of types, and for that reason I have indicated in diagrammatic form only a pendulum type comprising a pendulum 74 pivotally secured at 75 to a supporting structure 76 and so mounted on the vehicle as to be swung to the left during deceleration of the vehicle when the brakes are applied. Secured to and insulated from the pendulum 74 is a contact 77, which is adapted to successively engage a first stationary contact 78 and a second stationary contact 79. A spring 80 is arranged to oppose movement of the pendulum to the left.

When the brakes are applied and the vehicle decelerates, the pendulum 74 swings to the left under a force of inertia proportional to the rate of deceleration. It will therefore be obvious that the movable contact 77 will engage the first stationary contact 78 at one rate of retardation, and will then engage the second stationary contact 79 at a slightly higher rate of retardation. It is to be understood that the two stationary contacts 78 and 79 are provided with sufficient resiliency to permit this successive engagement.

The governor valve device 22 is embodied in a casing having a piston 82 disposed in a piston chamber 83 and a second piston 84 disposed in a second piston chamber 85. The two pistons 82 and 84 are joined by a stem 86 having collars 87 thereon adapted to engage and move a slide valve 88 coextensive with movement of the two pistons. The chamber 89 established between the two pistons is in communication with the piston chamber 83 by way of a port 90 in the piston 82, and is also in communication with the piston chamber 85 by way of port 91 in the piston 84.

Disposed in a lower part of the governor valve device casing is a valve 93 for controlling communication between the piston chamber 85 and the atmosphere, and another valve 94 for controlling communication between the piston chamber 83 and the atmosphere. The valve 93 is urged toward unseated position by a spring 95, and is adapted to be urged toward a seated position by movement of a movable abutment 96 to the right, the movable abutment having a stem 97 adapted to engage the valve 93. The movable abutment 96 is normally urged toward the left by a spring 98, and is adapted to be actuated to the right by supply of fluid under pressure to a chamber 99 which acts upon a diaphragm 100 to urge the movable abutment to the right.

The valve 94 is urged toward seated position by a spring 102, and is adapted to be urged toward unseated position by a second movable abutment 103 when actuated to the left. The movable abutment 103 is positioned to the right by a spring 104, and is adapted to be urged to the left by the supply of fluid under pressure to a pressure chamber 105, which acts upon a diaphragm 106 to urge the movable abutment 103 to the left so that its stem 101 engages the valve 94.

The brake valve device 14 is shown as being of the rotary type, but any other type performing the same functions may be employed. The rotary type shown comprises a casing defining a rotary valve chamber 108 having disposed therein a rotary valve 109 held upon its seat by a spring 110. The rotary valve chamber 108 is in constant communication with a feed valve device 111 by way of pipe and passage 112. The feed valve device 111 is connected to a main reservoir 113, and functions to maintain a substantially constant pressure of the fluid supplied from the reservoir 113 to the rotary valve chamber 108.

The rotary valve 109 is adapted to be rotated upon movement of the brake valve handle 114, to control communications to be hereinafter more fully described.

The operation of this embodiment of my invention is as follows:

When the vehicle or train is running, the brake valve handle 114 is maintained in release position, where the rotary valve 109 maintains the emergency pipe 43 connected to the feed valve device 111, by way of port 116 in the rotary valve and the rotary valve chamber 108. The pressure in piston chamber 33 of the emergency valve section 26 is therefore maintained at feed valve pressure and the piston 35 is held in its upper or biased position. The emergency reservoir 40 is thus charged from the emergency pipe 43, by way of the charging groove 44, slide valve chamber 32, and pipe 42.

The other parts of the apparatus shown will be substantially in the positions indicated in the drawing.

If now it is desired to effect an application of the brakes by straight air operation, the brake valve handle 114 is turned to the position where straight air pipe 118 is disconnected from exhaust port 119 through cavity 120 in the rotary valve 109, and to where both the straight air pipe 118 and emergency pipe 43 are open to the rotary valve chamber 108. Fluid under pressure then flows from the feed valve device 111 to the brake cylinder 12, through a communication including pipe and passage 112, rotary valve chamber 108, straight air pipe 118, passages 121 and 122 and cavity 123 in the emergency valve section 26, ball valve chamber 46, past the unseated ball valve 47, and through pipe and passage 124 leading to the brake cylinder.

When the pressure of the fluid thus flowing to the brake cylinder reaches approximately 10 pounds, the inshot piston 49 will be actuated downwardly far enough to permit ball valve 47 to close. Thereafter, fluid flows to the brake cylinder 12 from the ball valve chamber 46 through passage 125, chamber 58, past the unseated cut-off valve 54, chamber 59, pipe and passage 126, pipe and passage 127, and from thence by way of the aforementioned pipe and passage 124. It will thus be seen that when the inshot ball valve 47 closes fluid flows through a by-pass communication through the magnet valve section 30.

The inshot valve section 28 is provided to insure that a predetermined brake cylinder pressure is quickly established, so as to take up all slack in the brake rigging and apply the brakes with a predetermined light braking force.

If a maximum degree of braking is desired, the brake valve handle 114 is left in the straight air braking position. As the brake cylinder pressure builds up and the train decelerates, a rate of retardation will be reached at which the retardation controller pendulum 74 will be actuated far enough to the left to cause contact 77 to engage contact 78. When this takes place, the cut-off electromagnet in the magnet valve section 30, and the electromagnet in the cut-off by-pass magnet valve device 24, will be energized from a battery 129 through a circuit including, conductor 130, contacts 77 and 78, and conductor 131, the return circuit to the battery being by way of ground connections 132 and 133.

The cut-off valve 54 will then be seated to cut off the flow of fluid from the feed valve device 111 to the brake cylinder, and the cut-off by-pass valve 65 will be unseated to establish communication between chamber 58, and feed valve device 111, to chamber 89 in the governor valve device 22. However, as will appear more fully presently, the governor valve device 22 performs no useful function at this time.

If now the rate of retardation should increase to the point where pendulum 74 swings far enough to the left for contact 77 to engage contact 79, the release electromagnet in the magnet valve section 30 will be energized from the battery 129, through a circuit including conductor 130, contacts 77 and 79, and conductor 134, the return circuit to the battery being also by way of ground connection 132. Release valve 56 is then actuated to unseated position, and fluid under pressure is released from the brake cylinder 12 to the atmosphere, through a communication including pipe and passage 124, passage 127, choke 135, which restricts the rate of release, chamber 61, past the unseated release valve 56, chamber 62, passage 63, and safety valve device 52.

As soon as sufficient reduction in brake cylinder pressure has been produced by the release of fluid from the brake cylinder to cause a decrease in the rate of retardation, the pendulum 74 swings to the right to disengage contact 77 from contact 79, whereupon the release electromagnet will be deenergized and release valve 56 again seated to cut off the release of fluid under pressure from the brake cylinder.

If the rate of retardation should again increase, the cycle just described will be repeated by the retardation controller device, so that a rate of retardation substantially between that which causes engagement of contact 77 with contact 78 and that which causes engagement of contact 77 with contact 79 will be maintained throughout the greater part of the deceleration period.

Now when fluid under pressure was initially supplied to the brake cylinder, it also flows to chamber 67 in the pneumatic switch device 18, by way of pipe 140. When the pressure in chamber 67 exceeds some predetermined value, as for example 25 or 30 pounds per square inch, the piston 68 will be actuated upwardly and movable contact 71 will disengage from stationary contacts 72.

The contacts 71 and 72 control energization of the release by-pass magnet valve device 20 from battery 129. It will be noted that a push switch 136, having contacts 137 held open by a spring 138, is located in the circuit to this magnet valve device. This switch device is optional and is provided for a purpose which will be discussed later. For the present, contacts 137 will be assumed to be closed, but it is to be understood that the function performed by these contacts is not wholly essential to the generic aspects of the invention.

Therefore, with the contacts 137 of push switch 136 closed, as the pressure in the brake cylinder 12 decreases due to operation of the retardation controller device 16, a point will be reached, near the end of the deceleration period, when the pressure in the chamber 67 will have been reduced below 25 or 30 pounds per square inch, and piston 68 will move downwardly to again cause engagement of contact 71 with contacts 72. When this takes place the electromagnet in the release by-pass magnet valve device 20 will be energized from the battery 129, through a circuit including conductor 141, contacts 137, conductor 142, contacts 71 and 72, and conductor 143, the return connection to the battery being by way of ground connection 144.

The valve 65 will then be actuated to unseated position, and the brake cylinder 12 will be connected directly to the safety valve device 52, through a communication including pipe and passage 124, pipe and passage 127, pipe 140, past the unseated valve 65, pipe 145, and passage 146. The pressure in the brake cylinder will thus be reduced to the setting of the safety valve device, and this setting, which is above that which would permit the inshot ball valve 47 to unseat, is preferably low enough so that the degree of braking is reduced to the point where the rate of retardation produced is considerably below that maintained by the retardation controller device. The vehicle or train will thus be brought to a smooth stop, free of shock.

It should be evident that by reducing the rate of retardation at the end of the deceleration period that the stop will be lengthened somewhat. If the operator should desire to make a stop in the shortest possible distance, to prevent collision, to make a spot stop, or for other equally important reasons, he permits contacts 131 of push switch 136 to remain open, thereby maintaining the circuit to the release by-pass magnet valve device 20 open so that the brake cylinder is not connected directly to the safety valve device 52. The maximum rate of retardation will thus be maintained throughout the entire deceleration period.

If it is desired to effect an application of the brakes by automatic operation, the brake valve handle 114 is turned to the automatic position, where the rotary valve 109 blanks the straight air pipe 118 and where cavity 120 connects emergency pipe 43 to the atmosphere by way of exhaust port 119. When the emergency pipe 43 is thus vented to the atmosphere, the over-balancing pressure in slide valve chamber 32 of the emergency valve section 36 will cause the piston 35 to be moved downwardly to its lowermost position. In this position, slide valve 34 blanks passage 121 and connects passage 122 to the emergency reservoir 40. Fluid under pressure then flows from the emergency reservoir to the brake cylinder by way of the communication heretofore described in connection with a straight air application.

If the brake valve handle 114 is left in the automatic position, the parts then function as before described to limit the rate of retardation to that provided for by the retardation controller device.

In a similar manner, if it is desired to make a smooth stop, the operator depresses the push switch 136, and the pneumatic switch device 18 and release by-pass magnet valve device 20 function as before described to reduce the degree of braking at the end of the deceleration period.

If at any time there should be false energization of the conductor 131 leading to the cut-off by-pass magnet valve device 24, as would happen upon faulty engagement of contact 77 with contact 78, or upon faulty crossing of conductors 131 and 130, cut-off valve 54 in the magnet valve section 30, will be actuated to seated position. Therefore, when the brake valve handle is turned to application position, the brake cylinder pressure would be limited to that which causes the inshot valve 47 to seat, which is too low to stop the vehicle or train, were it not for the cut-off by-pass magnet valve device 24 and governor valve device 22. The magnet valve device 24 is at this time also energized to unseat its valve 65, to supply fluid under pressure to governor valve device chamber 89.

As fluid flows to chamber 89 it passes through port 90 in piston 82 to chamber 83, and also through port 91 into piston chamber 85. The piston chamber 85 is at this time in communication with the atmosphere, due to valve 93 being unseated. While the pressures in chambers 89 and 83 equalize, the pressure acting upon piston 84 from chamber 89 actuates the two pistons to the right to the position shown in the drawing if not already in this position. In this position, slide valve 88 connects the brake cylinder 12 to the slide valve chamber 89, and to feed valve device 111, by way of port 149, and pipe and passage 150. At the same time, communication is established between chamber 89 and diaphragm chamber 105, by means of passage 151.

Fluid under pressure flowing to chamber 89 also flows by way of passage 152 to diaphragm chamber 99. When the pressure in chamber 99 reaches some predetermined low value, as for example between 8 and 10 pounds per square inch, diaphragm 100 is actuated to the right, to cause seating of valve 93. Seating of this valve however does not disturb the position of the two pistons 82 and 84, as the pressures on either side of these two pistons are balanced.

However, as the pressure in chamber 89, and diaphragm chamber 105, continues to increase, when the pressure reaches approximately 40 pounds per square inch, diaphragm 106 will be actuated to the left to cause unseating of valve 94. Unseating of this valve vents chamber 83 to the atmosphere, and the overbalancing pressure in chamber 89 actuates pistons 82 and 84 to the left. Slide valve 88 then cuts off the communication to the brake cylinder through port 149, and connects diaphragm chamber 105 to exhaust port 154, through cavity 155. Diaphragm 106 then moves to the right to cause seating of the valve 94, to prevent undue loss of fluid under pressure, which would take place through port 90 in piston 82 were not valve 94 seated.

It will thus be seen that the governor valve device 22 functions during a brake application, when conductor 131 is falsely energized, to establish a brake cylinder pressure of approximately 40 pounds per square inch, which pressure is used by way of illustration to indicate some value of pressure sufficient to bring the vehicle or train to a stop.

When no faults exist in the system, and cut-off by-pass magnet valve device 24 remains deenergized, fluid under pressure supplied to the brake cylinder 12 also flows by way of pipe 150 to the governor valve device 22. If the slide valve 88 is in the position shown in the drawing, then fluid will flow through port 149 to chamber 89 and the valve device will operate as before described to move the slide valve to the left when the brake cylinder pressure reaches 40 pounds per square inch. This will not affect the brake cylinder pressure, which is controlled by either the brake valve device 14 or by the cooperative functioning of the magnet valve section 30 and the retardation controller device 16.

When the retardation controller device during normal operation energizes the electromagnet of cut-off valve 54 it also energizes the cut-off by-pass magnet valve device 24, but since the governor slide valve 88 is already in its left hand position the brake cylinder pressure is still unaffected.

In the adaptation of the embodiment described to a train, all of the parts shown in the drawing will of course be supplied on the head end or control car. On succeeding cars a control valve device 10, an emergency reservoir 40, a cut-off by-pass magnet valve device 24, a governor valve device 22, a switch device 18 and a release by-pass magnet valve device 20 may be supplied on each car in connection with the brake cylinder, or brake cylinders, of that car.

From the foregoing description it will be evident that I have provided a braking system in which the maximum rate of retardation is limited to a predetermined value, which may be reduced at the end of the deceleration period so as to make a smooth stop. In addition, I have provided means operative upon initiating a brake application while false energization of certain of the retardation controller circuits exists to insure sufficient braking for bringing the train to a stop, so that the fault may be cleared before damage results.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake system, in combination, a brake cylinder, means for effecting a supply of fluid under pressure to the brake cylinder, a retardation controller device operated according to the rate of retardation of the vehicle, means responsive to operation of said retardation controller device at a chosen rate of retardation for controlling fluid under pressure supplied to the brake cylinder, means operated upon a decrease in brake cylinder pressure below a predetermined value for further decreasing the brake cylinder pressure to a lower value, and means rendered operative upon faulty operation of said retardation controller device for establishing a brake cylinder pressure higher than said predetermined value.

2. In a vehicle brake system, in combination, a brake cylinder, means for effecting a supply of fluid under pressure to the brake cylinder, a control circuit, means operated according to the rate of retardation of the vehicle for connecting said circuit to a source of current supply, means responsive to energization of said circuit for cutting off the supply to the brake cylinder, means also responsive to energization of said circuit for establishing a by-pass communication through which fluid under pressure may flow to the brake cylinder, means operated upon a predetermined brake cylinder pressure for cutting off said supply through said by-pass communication, and means controlled by brake cylinder pressure for subsequently effecting a reduction in brake cylinder pressure.

3. In a vehicle brake system, in combination, a brake cylinder, means for effecting a supply of fluid under pressure to the brake cylinder either by straight air operation or by automatic operation, means for establishing a communication having three parallel branch paths through which fluid under pressure supplied to the brake cylinder flows, a first electroresponsive means in one of said branch paths for controlling flow through that path, a second electroresponsive means in another of said branch paths for controlling flow through that path, pressure operated valve means in the remaining one of said branch paths for controlling flow through that path, said pressure operated valve means being operable to close the associated path at a predetermined pressure of fluid supplied through said path, a retardation controller device, and means for controlling said two electroresponsive means according to operation of said retardation controller device.

4. In a vehicle brake system, in combination, a brake cylinder, means for establishing a communication through which fluid under pressure is supplied to the brake cylinder, means for supplying fluid under pressure through said communication, a valve device controlling said communication and operated upon a predetermined pressure of fluid supplied through said communication for closing said communication, means for establishing a by-pass communication around said valve device, electroresponsive valve means operable when energized to close said by-pass communication, means for establishing a second by-pass communication around said electroresponsive valve means, a second electroresponsive valve means operable when energized to open said second by-pass communication, means for cutting off the flow of fluid through said second by-pass communication at a pressure higher than said aforementioned predetermined pressure, a retardation controller device operated according to the rate of retardation of the vehicle, means responsive to operation of said retardation controller device at a chosen rate of retardation for releasing fluid under pressure from the brake cylinder, and means responsive to a predetermined low value of brake cylinder pressure for establishing a second communication through which fluid under pressure is released from the brake cylinder.

5. In a vehicle brake system, in combination, a brake cylinder, means for supplying fluid under pressure to the brake cylinder, a retardation controller device operated according to the rate of retardation of the vehicle, means responsive to operation of the retardation controller device for cutting off the supply of fluid to the brake cylinder and for establishing a communication through which fluid under pressure is released from the brake cylinder, means for establishing a second communication through which fluid under pressure is also released from the brake cylinder, and electrically controlled means normally maintaining said second communication closed and operated at a chosen brake cylinder pressure for opening said communication.

6. In a vehicle brake system, in combination, a brake cylinder, means for establishing a communication through which fluid under pressure is supplied to the brake cylinder, means for controlling opening and closing of said communication, means for establishing two communications through which fluid under pressure is released from the brake cylinder, an electrically operated valve device for controlling one of said two communications, a retardation controller device for controlling said electrically operated valve device, and electrically controlled means governed by brake cylinder pressure for controlling the other of said two communications.

7. In a vehicle brake system, in combination, a brake cylinder, means for supplying fluid under pressure to the brake cylinder, a retardation controller device operated according to the rate of retardation of the vehicle, means responsive to operation of said retardation controller device at a chosen rate of retardation for cutting off the supply to the brake cylinder and for establishing a communication through which fluid under pressure is released from the brake cylinder, means for establishing a second communication through which fluid under pressure is released from the brake cylinder, electroresponsive valve means operable when energized to open said second communication, contacts for controlling energization of said electroresponsive valve means, and means responsive to brake cylinder pressure for opening said contacts above a predetermined pressure and for closing said contacts below said predetermined pressure.

8. In a vehicle brake system, in combination, a brake cylinder, means for supplying fluid under pressure to the brake cylinder, a retardation controller device operated according to the rate of retardation of the vehicle, electroresponsive valve means responsive to operation of said retardation controller device at one rate of retardation for cutting off the supply to the brake cylinder and responsive to operation of said retardation controller device at another rate of retardation for establishing a communication through which fluid under pressure is released from the brake cylinder, means for establishing a second communication through which fluid under pressure is released from the brake cylinder, magnet valve means normally closing said second communication and adapted when energized to open said communication, a switch device responsive to brake cylinder pressure and operable at pressures above a predetermined value for preventing energization of said magnet valve means and operable at pressures below said predetermined value to permit energization of said magnet valve means, and manually operated means for effecting energization of said magnet valve means when said switch device is closed.

9. In a vehicle brake system, in combination, a brake cylinder, means for effecting a supply of fluid under pressure to the brake cylinder, a retardation controller device having two normally open contacts and operable at one rate of retardation to close one of said contacts and operable at another rate of retardation to close the other of said contacts, a safety valve device, means responsive to closing of one of said contacts for cutting off the supply of fluid under pressure to the brake cylinder, means responsive to closing of the other of said contacts for establishing a communication between said brake cylinder and said safety valve device to release fluid under pressure from the brake cylinder, means for establishing a second communication from said brake cylinder to said safety valve device, electroresponsive valve means normally closing said second communication and operable when energized to open said second communication, means for energizing said electroresponsive valve means, and means for preventing energization of said electroresponsive valve means for brake cylinder pressures above a predetermined value.

10. In a vehicle brake system, in combination, a brake cylinder, means for establishing a first communication through which fluid under pressure is supplied to the brake cylinder, an inshot valve device in said first communication operable at a predetermined pressure of fluid supplied through said first communication for closing said first communication, means for establishing a by-pass communication around said first communication, a retardation controller device having two normally open contacts and being adapted to close one of said contacts at one rate of retardation and to close the other of said contacts at a higher rate of retardation, a magnet valve device responsive to closing of said first contact for closing said by-pass communication, a safety valve device, a second magnet valve device responsive to closing of said second contact for establishing a communication between said brake cylinder and said safety valve device, means for establishing a second communication from said brake cylinder to said safety valve device, a normally deenergized magnet valve device in said second communication and operable when energized to open said communication, a circuit for energizing said second magnet valve device, and a switch device in said circuit responsive to brake cylinder pressure and operable to open said circuit for brake cylinder pressures above a chosen value and to close said circuit for brake cylinder pressures below said chosen value.

11. In a vehicle brake system, in combination, a brake cylinder, means for establishing a first communication through which fluid under pressure is supplied to the brake cylinder, means for supplying fluid under pressure through said first communication, an inshot valve device in said first communication and operable at a predetermined pressure for closing said communication, means for establishing a by-pass communication around said inshot valve device, means for controlling flow of fluid through said by-pass communication and operable to cut off said flow at a pressure higher than said predetermined pressure, electroresponsive valve means operable to close said by-pass communication when deenergized and to open said by-pass communication when energized, and means for controlling energization and deenergization of said electroresponsive valve means.

12. In a vehicle brake system, in combination, a brake cylinder, means for establishing a communication through which fluid under pressure is supplied to the brake cylinder, an inshot valve device in said communication operable at a predetermined pressure to close said communication, means for establishing a by-pass communication around said first communication, a magnet valve device operable when energized to close said by-pass communication, means for establishing a second by-pass communication around said first by-pass communication, a second magnet valve device operable when energized to open said second by-pass communication and when deenergized to close said second by-pass communication, means for energizing both of said magnet valve devices, and a governor valve device in said second by-pass communication operable to cut off flow of fluid through said second by-pass communication when the pressure of said fluid exceeds a predetermined value.

13. In a vehicle brake system, in combination, a brake cylinder, means for establishing a communication through which fluid under pressure is supplied to the brake cylinder, means for closing said communication, means for establishing a by-pass communication around said first communication through which fluid under pressure is also supplied to the brake cylinder, a magnet valve device normally closing said by-pass communication and operable when energized to open said communication, means for energizing said magnet valve device, a valve controlling flow of fluid through said by-pass communication, means responsive to a low value of pressure of fluid supplied through said by-pass communication for positioning said valve to permit flow through said by-pass communication, and means responsive to a high value of pressure of fluid supplied through said by-pass communication for positioning said valve to cut off flow through said by-pass communication.

EARLE S. COOK.